United States Patent [19]

Yano

[11] 4,115,501
[45] Sep. 19, 1978

[54] METHOD OF PRODUCING CEMENT PANELS REINFORCED WITH FIBERS

[75] Inventor: Naomichi Yano, Osaka, Japan

[73] Assignee: Kubota Ltd., Osaka, Japan

[21] Appl. No.: 768,533

[22] Filed: Feb. 14, 1977

[30] Foreign Application Priority Data

Feb. 12, 1976 [JP] Japan .................................. 51-14728
Feb. 12, 1976 [JP] Japan .................................. 51-14729

[51] Int. Cl.² .......................... C04B 41/04; B28B 1/16
[52] U.S. Cl. ................................... 264/133; 52/309.14;
52/309.17; 52/612; 264/145; 264/256; 264/333;
264/DIG. 43; 264/DIG. 57
[58] Field of Search ............... 264/133, 145, 256, 333,
264/DIG. 43, DIG. 57; 52/309.12, 309.14,
309.17, 612

[56] References Cited

U.S. PATENT DOCUMENTS

| 2,850,890 | 9/1958 | Rubenstein | 52/309.17 X |
|---|---|---|---|
| 3,295,278 | 1/1967 | Muhm | 264/DIG. 57 |
| 3,439,076 | 4/1969 | Loois | 264/256 X |
| 3,619,457 | 11/1971 | Chandler | 264/256 X |
| 3,787,545 | 1/1974 | Chandler | 264/256 X |
| 4,049,874 | 9/1977 | Aoyama | 264/256 X |

*Primary Examiner*—Thomas P. Pavelko
*Attorney, Agent, or Firm*—Armstrong, Nikaido, Marmelstein & Kubovcik

[57] ABSTRACT

A cement panel reinforced with fibers comprising a base plate composed predominantly of inorganic fibers and a cement, an inner waterproof layer of a synthetic resin formed on a surface of the base plate, a coloring material layer composed predominantly of a cement and a pigment and formed on the inner waterproof layer, and a surface waterproof layer of a synthetic resin formed on the coloring material layer. The synthetic resin of the inner waterproof layer, having penetrated into both the base plate and the coloring material layer and solidified, gives a fastener effect, bonding them together. Also disclosed is a method of producing such cement panels comprising the steps of preparing a base plate material from a mixture consisting predominantly of inorganic fibers and a cement, applying a liquid synthetic resin composition to a surface of the base plate material which has started to solidify but is still in a soft state to form an inner waterproof layer thereon, applying a coloring material composed predominently of a cement and a pigment to the inner waterproof layer to form a coloring material layer thereon, pressing the resulting base plate material, and shaping the pressed material, whereby the liquid synthetic resin composition is caused to penetrate into both the base plate material and the coloring material layer. The panels obtained have high freeze-thaw resistance.

3 Claims, 6 Drawing Figures

METHOD OF PRODUCING CEMENT PANELS REINFORCED WITH FIBERS

BACKGROUND OF THE INVENTION

Cement panels consisting predominantly of asbestos fibers and cement and thus reinforced with the fibers are widely used as roof and wall materials for buildings because they are flame-retardant and outstanding in mechanical strength, heat insulating properties and soundproofness.

Cement panels reinforced with fibers include those produced by a dry method in which water is applied to a layer composed predominently of a mixture of asbestos fibers and cement, and the wet layer is pressed and thereafter shaped. The cement panels obtained contain a reduced amount of water, have relatively high freeze-thaw resistance and are therefore advantageous to use in a cold climate. If asbestos-cement panels contain residual water, the water freezes and expands when it is cold, and the frozen water contracts on thawing. Consequently, daily variations in the atmospheric temperature of cold climate produces stress in the asbestos-cement panel due to its expansion and contraction. When the panel is repeatedly subjected to such stress, cracks will eventually develop in the panel. The higher the water content, the greater is the stress and the greater will be the susceptibility of the panel to cracking. Thus the use of asbestos-cement panels made by the dry method and having a lower residual water content is advantageous in avoiding the cracking, namely the damage due to freezing and thawing.

As shown in FIG. 4, conventional cement panels reinforced with fibers and produced by the dry method comprises a base plate 1 made predominantly from asbestos fibers and cement, a coloring material layer 2 composed predominantly of portland cement and pigment and bonded to the base plate 1 to give an improved appearance to the base plate 1, and a colorless transparent surface waterproof layer 3 covering the surface of the coloring material layer 2 and formed by applying a liquid acrylic resin composition to the surface.

However, the fiber-reinforced cement panels made by the dry method still involve the problem that when they are used as roof tiles for buildings in a cold district, the coloring material layer 2 becomes separated from the base plate 1 over an area of 1 to 2 cm in diameter.

When such fiber-reinforced cement panels were tested for freeze-thaw resistance in accordance with Method C 290-61 T specified by ASTM in which they were subjected to freeze-thaw cycles by being allowed to stand at −18° C for 2 hours and at +5° C for 1 hour alternately repeatedly, separation occurred when they were exposed to 60 cycles. Although the mechanism in which the freeze-thaw cycles cause the separation of the coloring material layer 2 still remains to be fully clarified, it is believed that the water migrating from the base plate 1 to the coloring material layer 2 repeatedly freezes and thaws, resulting in stress cycles and thereby breaking down the coloring material layer which has relatively low resistance.

Japanese Patent Publication SHO 46-1419 discloses a method in which a solidified base plate is covered with a layer of coloring cement material. However, since no consideration whatever is given to its freeze-thaw resistance, the covering layer appears very prone to separation when the residual water is subjected to freeze-thaw cycles.

In an attempt to improve the freeze-thaw resistance, I have carried out intensive research and accomplished the method of this invention for producing cement panels reinforced with fibers and having satisfactory properties.

SUMMARY OF THE INVENTION

In producing cement panels reinforced with fibers by the dry method, this invention is characterized by applying water to a layer of mixture composed predominantly of a cement and inorganic fibers to prepare a base plate material, applying a liquid synthetic resin composition to the base plate material which has started to solidify but is still in a soft state, thereafter applying to the base plate material a finely divided coloring material composed predominantly of a cement and a pigment, and pressing the resulting base plate material, whereby the liquid synthetic resin composition is caused to penetrate into both the soft base plate material and the coloring material layer to form an inner waterproof layer between the base plate material and the coloring material layer.

An object of this invention is to produce a cement panel reinforced with fibers by applying a liquid synthetic resin composition to a base plate material while the material is still in a soft state to form an inner waterproof layer on the plate material so that the resulting base plate can be firmly bonded to a coloring material layer by the waterproof layer to impart high freeze-thaw resistance to the panel.

Another object of this invention is to provide a cement panel reinforced with fibers wherein a waterproof layer has penetrated deep into both a base plate and a coloring material layer to firmly bond them together and to thereby give high freeze-thaw resistance to the panel.

Still another object of this invention is to provide a cement panel reinforced with fibers and a method of making the same, the panel comprising a base plate, a coloring material layer, and two waterproof layers provided therebetween and over the coloring material layer respectively, the panel further being coated with a synthetic resin such as an acrylic resin and thereby greatly improved in its freeze-thaw resistance.

DETAILED DESCRIPTION OF THE INVENTION

Figure 1:
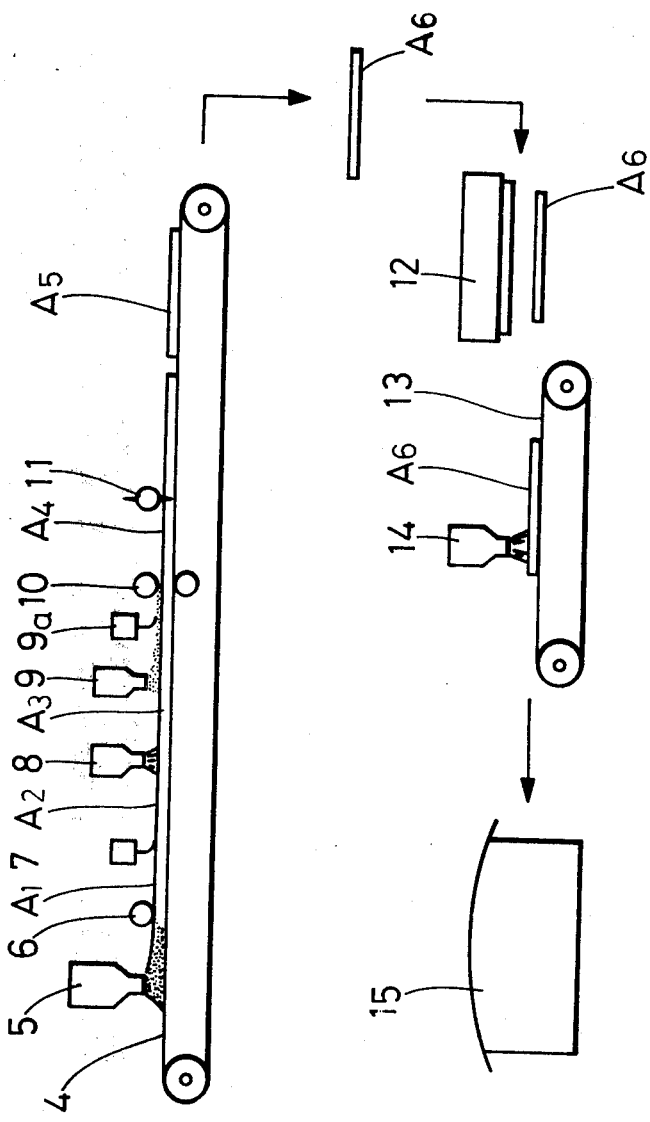
FIG. 1 is a diagram illustrating a method of producing cement panels reinforced with fibers according to this invention.

FIG. 1 shows an example of the method of this invention for producing cement panels reinforced with fibers. The method illustrated in FIG. 1 differs from the conventional dry method in that a resin applicator 8 for a liquid synthetic resin composition is interposed between a water applicator 7 and a feeder 9 for a coloring material.

An elongated endless belt conveyor 4 is provided at its one end with a hopper 5 for continuously feeding onto the belt conveyor 4 a powdery base plate material consisting predominantly of portland cement, siliceous sand and inorganic fibers. A leveling roller 6 adjacent the hopper 5 levels the material to a layer $A_1$ of uniform thickness. A water applicator 7 applies water to the layer $A_1$ at a constant rate to wet the layer, whereupon the cement starts to solidify. A liquid thermoplastic or thermosetting synthetic resin composition is applied by the resin applicator 8 such as a sprinkler to the base plate layer, now designated at $A_2$ and still in a soft state, at a rate of about 40 g/m$^2$ and is allowed to penetrate into the layer $A_2$ to obtain a base plate layer $A_3$ having a synthetic resin waterproof layer on its upper surface.

A finely divided coloring material consisting predominantly of portland cement, a fine siliceous sand powder and an organic or inorganic pigment is applied by the feeder 9 to the base plate layer $A_3$. A water applicator 9a applies water onto the coloring material layer at an appropriate rate to wet the coloring material. The base plate layer is thereafter compressed by rolls 10 over the coloring material layer to obtain a compacted green layer $A_4$ having a colored surface.

The colored green layer $A_4$ is cut to a specified length by a roll cutter 11, namely to segments $A_5$, which are then spontaneously cured for 2 to 3 days to prepare semihardened plates $A_6$. The plates 6 are further cut to the dimensions of the desired product by a cutter 12. The resulting plates are then placed on a belt conveyor 13. A second resin applicator 14 applies a liquid synthetic resin composition to the plates $A_6$, each over the surface of the coloring material layer, at a rate of about 200 to 300 g/m$^2$. The liquid resin composition is spread by the flow coater method over the front surface of the semihard plates $A_6$, over the cut end faces and over the opposite side faces and is allowed to adhere to the surfaces, whereby a surface waterproof layer is formed.

The plates are then withdrawn from the belt conveyor 13, stacked and placed into an autoclave 15, in which the plates are heated and subjected to pressure with steam at 180° C and 7 atm, whereby finished panels are obtained as the desired product.

The inorganic fibers to be incorporated into the base plate material are usually asbestos fibers. Also useful are glass fibers and metal fibers, which are usable in admixture with asbestos fibers.

The liquid synthetic resin composition applied by the first applicator 8 to the surface of the base plate layer $A_2$ penetrates into the layer $A_2$ and into the coloring material layer and solidifies so as to prevent the migration of water from the base plate into the coloring material layer. For this purpose, it is suitable to use an acrylic resin emulsion. Also useful are aqueous emulsions of vinyl acetate and vinyl acetate-acrylate copolymers, dispersions or solutions of vinyl chloride, epoxy resins, urethane-type resins and other synthetic resins, and inorganic coating compositions of the water glass type and polyphosphoric type.

The liquid synthetic resin composition applied to the semihard plate $A_6$ by the second resin applicator 14 prevents the calcium silicate on the surface of the coloring material layer 2 from giving a whitish appearance to the colored surface of the product, while protecting the surface of the coloring material layer and imparting waterproofness to the layer. The composition must be colorless and transparent so as not to impair the attractive appearance of the coloring material layer. For this purpose, acrylic resin emulsions are most suitable. Also usable is any one of the above-mentioned synthetic resin compositions useful for application to the base plate layer $A_2$ by the first resin applicator 8, insofar as the composition fulfils the foregoing requirements.

Figure 2:
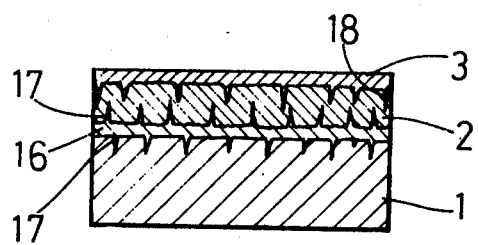
FIG. 2 is a sectional view showing a cement panel reinforced with fibers and produced by the method of this invention.

FIG. 2 shows a section of the fiber-reinforced cement panel produced by the method illustrated in FIG. 1. For a better understanding, the waterproof layers 16, 3 and coloring material layer 2 are shown with exaggerated thickness. Practically useful thicknesses are about 4.6 mm for the base plate 1, about 1 mm for the coloring material layer 2 and about 0.5 mm for the waterproof layers 16, 3. The inner waterproof layer 16 formed between the base plate 1 and the coloring material layer 2 acts to prevent the residual water in the base plate 1 from migrating into the coloring material layer 2. During the production process, the liquid synthetic resin composition of inorganic coating composition applied to the surface of the base plate layer $A_2$ penetrates into the underlying and overlying layers and then solidifies, forming numerous projections 17 extending from the layer 16 into the base plate 1 and the coloring material layer 2 through spaces among the particles thereof. The fastener effect afforded by the projections 17 holds the waterproof layer 2 firmly bonded to the base plate 1 and to the coloring material layer 2, thereby precluding the separation of the coloring material layer 2 from the base plate 1. Although the base plate 1 differs from the coloring material layer 2 in coefficient of thermal expansion relative to variations in temperature, the waterproof layer 16 interposed therebetween mitigates the difference in coefficient of thermal expansion mainly by the deformation of the projections 17, thus preventing the breakdown of the coloring material layer 2 due to thermal deformation. In fact, such effect of the waterproof layer 16 is achieved by the numerous projections 17 on the layer 16 which are formed by applying the liquid synthetic resin composition to the base plate layer while the layer $A_2$ is still in a soft state during production and subsequently applying the coloring material to the resin composition layer. If the liquid resin composition is applied later to the base plate layer which has hardened, it is impossible to obtain a product having high freeze-thaw resistance as provided by this invention.

The waterproof layer 3 on the coloring material layer 2 serves to prevent the defacement of the layer 2 as well as the penetration of water thereinto from outside. The liquid synthetic resin composition applied to the coloring material layer 2 during the production process solidifies after penetrating into the layer 2 through spaces among the particles of the coloring material, forming numerous projections 18 extending into the coloring material layer 2, whereby the surface waterproof layer 3 is firmly bonded to the coloring material layer 2.

EXPERIMENTAL EXAMPLE

Asbestos-cement panels according to this invention were prepared by the method shown in FIG. 1 with the use of the liquid synthetic resin composition given below.

| Component | | Amount (wt. %) |
|---|---|---|
| Base monomer: | butyl acrylate | 22 – 42 |
| Auxiliary film-forming agent: | 2,2,4-trimethyl-1,4-pentadiol | 1 – 2 |

| Component | | Amount (wt. %) |
|---|---|---|
| Thickening agent: | 2.4% sodium polyacrylate | 9 – 36 |
| Dispersants: | polyoxyethylene lauryl ether | 2 – 4 |
| | sulfate of higher alcohol | 0.1 |
| pH adjusting agent: | alkanolamine | 0.4 |
| Antifoaming agent: | organosilicon-type compound | 0.1 |
| Antiseptic: | organotin compound | 0.4 |
| Water | | balance |

The product was tested for freeze-thaw resistance by ASTM Method C 290-61 T at −18° C and +5° C. Separation occurred for the first time when the product was exposed to 180 to 200 cycles. This reveals that the product of this invention has much higher freeze-thaw resistance than the conventional products.

Figure 3:
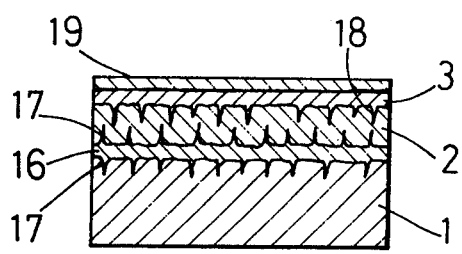
FIG. 3 is a sectional view showing another embodiment of the fiber-reinforced panel of this invention.

FIG. 3 shows another embodiment of the fiber-reinforced cement panel according to this invention. It is prepared from a cement panel, the same as one shown in FIG. 2 and obtained from the heat treatment in the autoclave 15 in the method of FIG. 1, by coating the panel with an composition of a urethane-type resin, such as copolymer of urethane and epoxy monomer or of urethane and acrylic acid or like acrylic monomer, to form a synthetic resin layer 19 on the surface waterproof layer 3. The synthetic resin layer 19 protects the surface waterproof layer 3 and gives improved freeze-thaw resistance. When tested for freeze-thaw resistance in the same manner as above according to ASTM Method C 290-61 T, the product was found to withstand 350 cycles.

Figure 4:
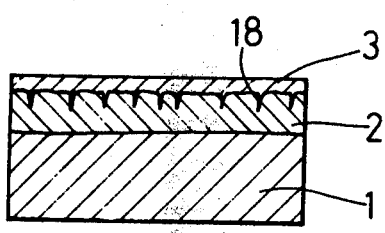
FIG. 4 is a sectional view showing a conventional cement panel reinforced with fibers.
Figure 5:
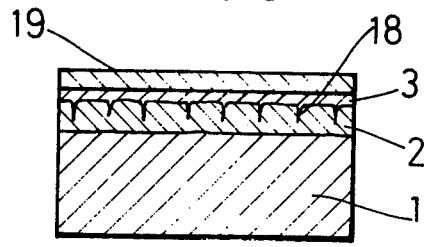
FIGS. 5 and 6 are sectional views showing other embodiments of the fiber-reinforced cement panel of this invention.

FIG. 5 shows a cement panel prepared from a fiber-reinforced cement panel having the same construction as the conventional one shown in FIG. 4 and obtained by the process of FIG. 1 without the application of the liquid synthetic resin composition by the first resin applicator 8, namely by the conventional dry method. The panel of FIG. 5 is produced by coating the waterproof layer 3 of the conventional construction with a composition of urethane-type resin like the above composition to form a synthetic resin layer 19 on the surface of the waterproof layer 19. The panel thus prepared has nearly the same freeze-thaw resistance as the panel of FIG. 2.

The synthetic resin materials heretofore used for the waterproof layer 3 on the coloring material layer of fiber-reinforced cement panels are not fully useful in respect of freeze-thaw resistance. I have found the surprising fact that composition of urethane-type resins, such as copolymer of urethane and acrylic acid or like acrylic monomer, and copolymer of urethane and epoxy monomer, afford remarkably improved freeze-thaw resistance when used for the waterproof layer on the coloring material layer.

Figure 6:
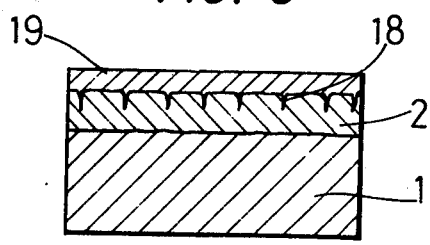

FIG. 6 shows another embodiment of this invention produced by the same method as shown in FIG. 1 except that the first resin applicator 8 is not used for the application of resin composition and that a composition of a urethane-type resin is applied at a rate of 100 to 300 g/m² to the coloring material layer 2 by the second resin applicator 14 to form a synthetic resin layer 19 substituting for the surface waterproof layer and penetrating into the coloring material layer 2. The coated base plate layer is subjected to high temperature and high pressure within the autoclave 15.

Outstanding freeze-thaw resistance is afforded by the urethane-type resin layer 19 which is formed on the waterproof layer 3 subsequent to the autoclaving step indicated at 15 as is the case with the embodiments of FIGS. 3 and 5, and also by the layer 19 which is formed on the coloring material layer 2 and thereafter autoclaved as is the case with FIG. 6.

Examples of useful urethane-type resin compositions are acrylo-urethane coating compositions of the two component type comprising acrylic acid-polyol as the main component and a non-yellowing sliphatic isocyanate compound as a hardning agent.

These compositions are used as diluted to a suitable visiocity with a thinner. Use of a acrylic acid having an aromatic group attached thereto will result in yellowing and reduced whether resistance.

The retio of the main component to the hardning agent may range from 20:1 to 4:1 by weight and is preferablly 10:1 by weight.

More specific examples are:

A composition comprising 10 wt. parts of V-TOP 100 (Trademark of Dai Nippon Toryo Co., Ltd. Japan for acrylic acid-polyol having an OH value of 40 and containing 0.5 part of pigment), 1 wt. part of hardening agent and 1.1 to 4.4 wt. parts of thinner. The composition has a visiosity by IWATA cup of 12–14 sec. at 25° C and is applied at a rate of 150–200 g/m².

Another composition comprising 16 wt. parts of EP-COAT R (Trademark of Chugoku Toryo Co. Ltd. Japan for acrylic acid-polyol), 2 wt. parts of 72-E (hardning agent), and 5 to 6 wt. parts of EP-COAT thinner S. The composition has a viscosity by IWATA cup of 13–15 sec. at 25° C and is applied at a rate of 260–200 g/m².

The drawings are given solely for the illustration of this invention and are in no way limitative to the scope of this invention. Without departing from the spirit of the invention, the invention can be embodied by one skilled in the art with various modifications and alterations, which therefore are included within the scope of the appended claims.

I claim:

1. A method of producing cement panels reinforced with fibers comprising the successive steps of:

preparing a soft base plate material by spreading a mixture composed predominantly of inorganic fibers and a cement to a uniform thickness and applying water to the spread mixture, applying a liquid synthetic resin composition to a surface of the soft base plate material to form an inner waterproof layer thereon, with the synthetic resin composition penetrating into the base plate material among the particles thereof, applying a finely divided coloring material to the waterproof layer immediately after the application of the synthetic resin composition to form a layer of the coloring material, with the synthetic resin composition penetrating also into the coloring material layer among the particles thereof, the coloring material being composed predominantly of a cement and a pigment mixed together, pressing the resulting coated base plate material to compact the material, cutting the compacted material to a shape of suitable dimensions in accordance with the dimensions of the product to be obtained and to thereby obtain base plates, spontaneously curing the base plates for 2 to 3 days to obtain semihardened base plates, applying a colorless transparent liquid synthetic resin composition to the coloring material layer of each of the semihardened base plates to form a surface waterproof layer, and maintaining the resulting base plates in a high-temperature high-pressure atmosphere.

2. A method as defined in claim 1 wherein the liquid synthetic resin composition used in the step of forming the inner waterproof layer is an acrylic resin emulsion.

3. A method as defined in claim 1 wherein the base plates withdrawn from the high-temperature high-pressure atmosphere are further coated with a urethane-type resin emulsion over the surface waterproof layer.

* * * * *